Feb. 8, 1927.  
T. YAMAMOTO ET AL  
1,617,092
INDUCTION SYNCHRONOUS MOTOR
Filed July 1, 1922
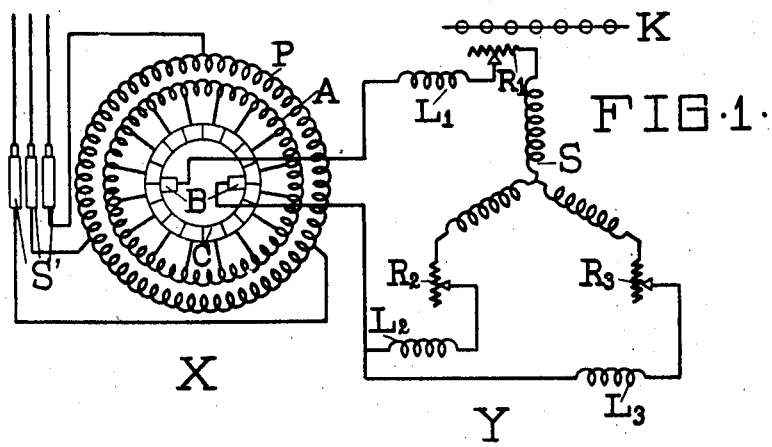
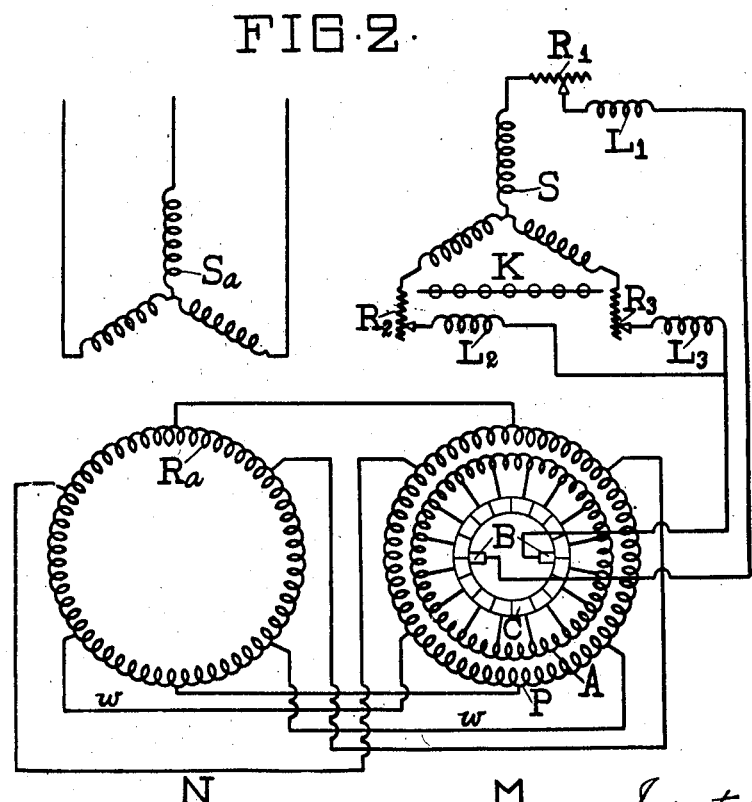
Inventors:  
Tadaoki Yamamoto and  
Masataro Kawarada  
By Attys Fraser Turk & Myers.

Patented Feb. 8, 1927.

1,617,092

UNITED STATES PATENT OFFICE.

TADAOKI YAMAMOTO, OF TAKATA-MACHI, AND MASATARO KAWARADA, OF NIPPORI-CHO, JAPAN.

INDUCTION SYNCHRONOUS MOTOR.

Application filed July 1, 1922. Serial No. 572,301.

Although the induction motor and the synchronous motor have been developed as different types of machines, yet they belong to one and the same class of alternating current motors in that they have many features in common, such as the same synchronous speed and a similar magnetizing characteristic.

The induction motor is superior in its starting characteristic, while the synchronous motor excels in its operating characteristic.

The desirability of combining the superior qualities adherent to these two machines in one machine is evident and it has been partially realized in a synchronous motor by adding to it a squirrel cage winding of a suitable design, by means of which the field of its application has been extended to the state prevailing at present.

On the other hand, the same sort of thing has been tried in an induction motor in converting it at the running condition into a synchronous motor, but the manual operation which is inevitable during the stage of transition seems to have been the main cause limiting the field of its practical application.

This invention aims to meet the long felt need in this art and the object has been accomplished in an exceedingly simple manner by uniting an induction motor with a direct current series generator. By so doing, the transition from an induction to a synchronous motor is carried on perfectly automatically without a single mechanical attachment such as a centrifugal device. Besides, by providing a high resistance squirrel cage winding, which may serve as wedges too, the torque speed characteristic during the accelerating stage can be made substantially equal to that of Boucherot's double squirrel cage type.

By the construction mentioned above, the motor can be started with a full load torque by a mere throwing-in of a main switch and it will run up clear to its synchronous speed with a torque which is not less than the full load value and will subsequently step into synchronism spontaneously without the help of any automatic devices whatsoever.

The induction synchronous motor upon which the present invention is immediately an improvement, is that set forth in the application of T. Yamamoto and M. Kawarada filed in the United States of America July 16th 1921, Serial Number 485,196. In the device set forth therein, an induction motor and a direct current series generator was connected in cascade and the two machines were coupled directly to each other.

According to this invention, instead of providing two separate machines, the induction motor and the series generator have been united in one and the same machine, thus presenting an appearance of unitary structure.

The uniting of the two machines into one machine will have the peculiar advantage, beside the simplification in construction, in that the armature of the series generator is always influenced by the rotating field due to the primary current, which fact results in insuring the unerring establishment of the direct current in the secondary circuit.

This invention also comprises, as an example of its application, a combination with another induction motor connected in cascade with the machine above referred to. In this combination, a large magnetizing current and various deficiencies resulting therefrom which exist in the concatenated induction motors heretofore proposed are obviated.

The accompanying drawings illustrate the preferred embodiment of the present invention.

Figure 1 is a diagrammatic representation of the induction synchronous motor according to the invention.

Figure 2 is a diagrammatic representation of the induction synchronous motor according to this invention connected in cascade to an induction motor.

Referring first to Figure 1 the induction synchronous motor consists of the rotor X and the stator Y. The primary winding P provided in the slots on the rotor core may be connected to a source of alternating current through the slip rings S'. The armature winding A of the D. C. type, which is preferably placed in the same slots in which the primary winding P is placed, should have a small number of turns as compared to the said primary winding in order to minimize the voltage induced by the primary current in the said primary winding. The D. C. armature winding A is connected through the commutator C and the brushes B to the field winding S provided on the stator Y. At starting, the field winding S acts as the secondary winding as against the primary winding P and is preferably connected to the D. C. winding A through the reactances $L_1$, $L_2$, $L_3$ and the adjustable resistances $R_1$, $R_2$, $R_3$. These reactances and the resistances need not necessarily be placed in each of the phases separately but one of each of them, say $L_1$ and $R_1$ only may be provided. After the machine has stepped into synchronism, the adjustable resistances $R_1$, $R_2$ and $R_3$ may be employed for the regulation of the exciting current. A high resistance squirrel cage winding K should preferably be placed on the stator core Y for the purpose of facilitating the starting. In Figure 1, the stator winding S is shown as a star-connection, but a delta-connection may equally be used. The windings P and S may also be of a two-phase or multiphase winding other than that of the three phase.

In the machine constructed as above, if an alternating current is supplied to the primary winding P through the slip-rings S', the machine will start as an ordinary induction motor, since the stator winding S acts inductively against the primary winding P. In case a high resistance squirrel cage winding K and the reactors of high inductance $L_1$, $L_2$, $L_3$ are provided, this combination will act selectively in that, at starting the former will act principally, while, as the machine gains in speed, it is the latter which acts principally because of the gradual decrease of the secondary frequency. As the speed of the machine increases and the relative velocity of the primary field with respect to the secondary winding S decreases to a certain extent, the magnetic field of the D. C. generator will be established in one or the other direction according to the circumstances, and from this time on the series wound machine will operate as a direct current generator supplying a direct current to the stator winding of the machine. This current flowing in the stator winding produces a stationary magnetic field along the periphery of the stator core and thus the rotor will be attracted by the mutual electromagnetic force and in this manner the machine will be synchronized automatically.

As stated above, in this invention the armature winding A being influenced, from the very instant the machine is connected on to the line, by the magnetic field of the primary winding, the establishment of the exciting current in the secondary circuit is effected in a sure manner.

The fact that the D. C. armature winding is in the same field as the primary winding has a very favorable effect upon the performance of the machine in that the power factor may be automatically adjusted to any desired value, for example, at 100 per cent, regardless of load, by setting the brushes at a suitable retarded position from the neutral zone with respect to the direction of rotation of the motor.

Figure 2 illustrates an example of the applications of the present invention. In this figure the same characters of reference are employed for the parts which correspond to those of Figure 1. In Figure 2, the machine M which is constructed as explained above is connected in cascade with an induction motor N, both machines being preferably directly coupled. The induction motor N comprises a stator provided with the primary winding $S^a$ and a rotor provided with the secondary winding $R^a$.

The two rotor windings $R^a$ and P are wound for the same number of phases and are connected to each other by the set of wires $w$ as shown in the figure. Their number of poles, however, need not be same.

The starting of this machine will take place in an exactly similar manner as that of the machine of Figure 1. The aggregate will start of itself, excite itself and synchronize of itself when simply thrown on to the line.

If the number of poles of the machine M be equal to that of the machine N, each of the machines will share an equal portion of the load and the aggregate will run at half the normal synchronous speed. In the running condition, the power factor of the aggregate can be adjusted to unity or to any desired value by adjusting the resistances $R_1$, $R_2$ and $R_3$.

Since the synchronous speed corresponds to the sum of the number of poles of the two component machines M and N, it is easy to construct the aggregate machine which runs at a low speed and yet operates at a high efficiency.

The absence of slip rings also enables us to introduce high voltage currents directly to the machine without the intermediary of a step down transformer.

If the number of poles of either one or both of the component machines M and N be variable, the synchronous speed of the aggregate machine may be varied at will.

If desired, a squirrel cage winding extending longitudinally along both rotors may be employed in place of two separate rotor windings $R^a$ and P, and also it is evident that the functions of the stators and the rotors may be exchanged without any difference except in minor mechanical constructions.

What we claim is:—

1. A polyphase induction synchronous motor consisting of a polyphase induction motor and a direct current series generator united into one and the same machine, comprising a rotor having a polyphase primary winding permanently connected to the terminals of the machine and a direct current armature winding independent of the said primary winding, a commutator to which the said armature winding is connected, and a stator having a polyphase winding, the terminals of which are connected in two groups with the said armature winding through brushes and the said commutator.

2. A polyphase induction synchronous motor consisting of a polyphase induction motor and a direct current series generator united into one and the same machine, comprising a rotor having a polyphase primary winding permanently connected to the terminals of the machine and a direct current armature winding independent of the said primary winding, a commutator to which the said armature winding is connected, and a stator having a polyphase winding, the terminals of which are connected in two groups with the said armature winding through an adjustable resistance, brushes, and the said commutator.

3. In combination, an alternating current motor consisting of an induction motor and an induction synchronous motor mechanically coupled to the said induction motor, the said induction sychronous motor comprising a rotor having a polyphase primary winding permanently connected to the terminals of the machine, an independent armature winding, a commutator to which the said armature winding is connected and a stator having a polyphase winding, the terminals of which are connected in two groups with the said armature winding through brushes and the said commutator.

4. In combination, an alternating current motor consisting of an induction motor and an induction synchronous motor mechanically coupled to the said induction motor, the said induction synchronous motor comprising a rotor having a polyphase primary winding permanently connected to the terminals of the machine, an independent armature winding, a commutator to which the said armature winding is connected and a stator having a polyphase winding, the terminals of which are connected in two groups with the said armature winding through an adjustable resistance, brushes, and the said commutator.

In witness whereof, we have hereunto signed our names.

TADAOKI YAMAMOTO.
MASATARO KAWARADA.